UNITED STATES PATENT OFFICE.

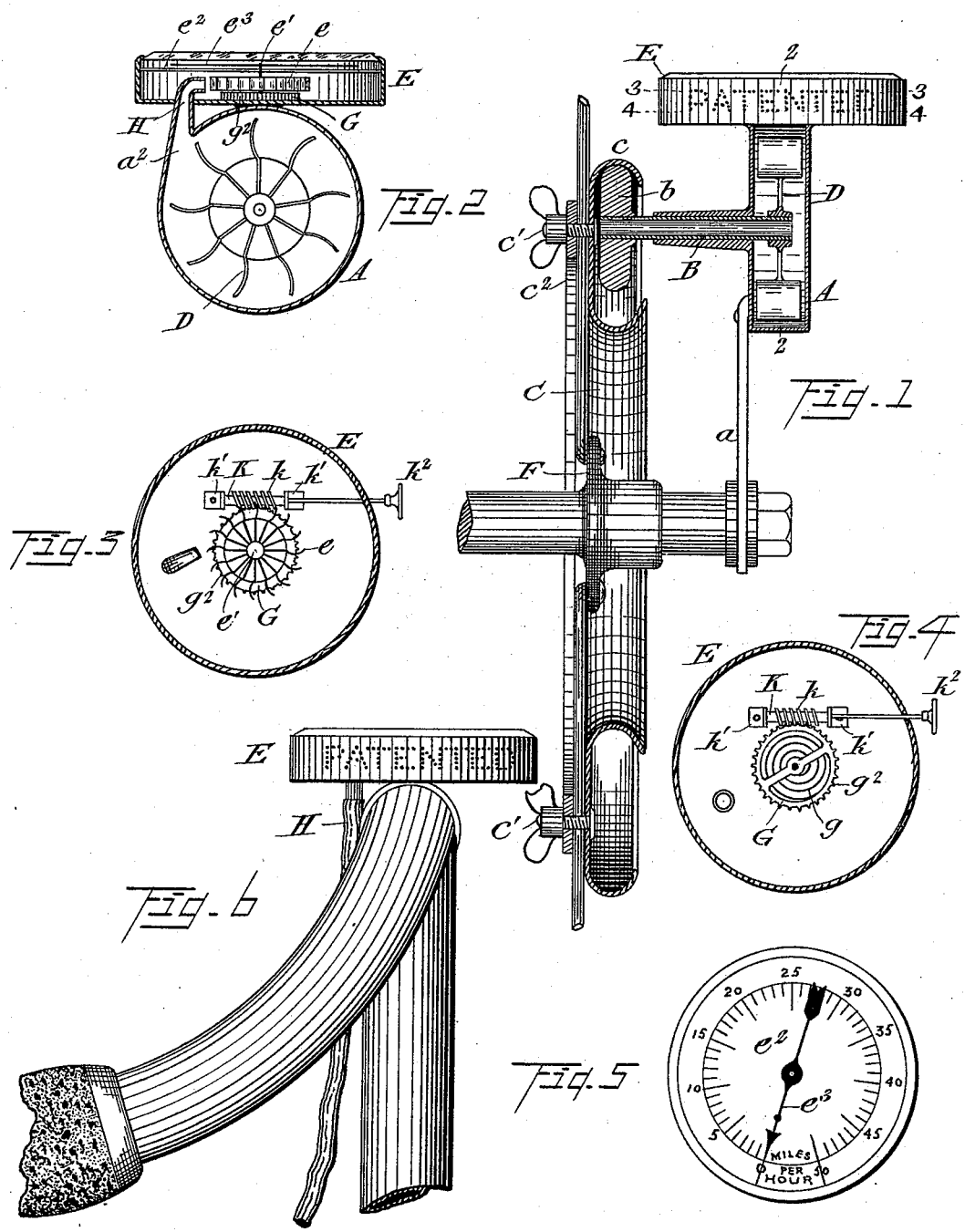

HARRY H. KELLEY, OF ELYRIA, OHIO.

SPEED-MEASURE.

SPECIFICATION forming part of Letters Patent No. 570,024, dated October 27, 1896.

Application filed August 26, 1895. Serial No. 560,487. (No model.)

*To all whom it may concern:*

Be it known that I, HARRY H. KELLEY, a citizen of the United States, residing at Elyria, in the county of Lorain and State of Ohio, have invented certain new and useful Improvements in Pneumatic Speedometers; and I do hereby declare the following to be a full, clear, and exact description of the invention, such as will enable others skilled in the art to which it appertains to make and use the same.

The object of the invention is to provide a cheap and simple device with which one may determine, at any time, the speed at which a vehicle to which it is attached is traveling.

The device is especially adapted for use upon bicycles, although it may be used upon any wheeled vehicle.

The invention consists in the construction and combination of parts shown in the drawings, and hereinafter described and claimed.

In the drawings, Figure 1 is a partial sectional view of the device, showing the mode of attachment thereof to a bicycle. Fig. 2 is a sectional view on line 2 2 of Fig. 1. Fig. 3 is a sectional view on line 3 3 of Fig. 1. Fig. 4 is a sectional view on line 4 4 of Fig. 1. Fig. 5 is a plan view of the device. Fig. 6 is a view showing the upper casing attached to the handle-bar of a bicycle and connected with the lower casing by flexible tubing.

Referring to the parts by letter, A represents a cylindrical casing, which is adapted to be secured to some stationary part of the vehicle. In the form shown it is provided with a leg $a$, which is designed to be bolted to the projecting end of the front axle of a bicycle. A horizontal driving-shaft B is journaled in suitable bearings in the casing, and a friction driving-wheel $b$ is secured to the outer end of said shaft. A flanged ring C is secured to the wheel F, concentric with its axis, and the casing A is held in such position that the flange $c$ of said ring C engages with and revolves the wheel $b$. The face of the wheel is preferably semicircular in form, and the flange of the ring C is similarly formed. The ring C may be made of sheet metal, and it may be secured to the spokes of the wheel by means of bolts $c'$, which pass through it and a corresponding ring $c^2$, which lies against the opposite sides of the spokes.

On the driving-shaft, within the casing A, a fan-wheel D is secured. The shaft B is hollow, whereby air is admitted to the casing, and the casing is provided with an outlet $a^2$ in its periphery. This casing, the fan and its driving mechanism constitute a rotary blower by means of which air is drawn in through the shaft and forced out through the outlet $a^2$.

A second casing E, which contains certain mechanism to be presently explained, is connected with the casing A by a tube H. This casing E may be placed at any convenient point, as, for example, it may be connected to casing A, as shown in Fig. 1, or it may be secured to the handle-bars, as shown in Fig. 6. The length of the tube will depend upon the relative positions of the two casings.

Within the casing E is a fan-wheel $e$, which is secured to a shaft $e'$. The tube H enters the casing E and terminates in a jet-nozzle directed against the blades of the fan-wheel $e$. The force of the air-blast from the nozzle turns the fan-wheel $e$ from the position in which it normally rests, and the extent of the deflection of the wheel from this position is proportionate to the force of the air-blast. Above the fan-wheel $e$ is a graduated dial $e^2$. A pointer $e^3$ is secured to the shaft $e'$ and lies above the dial. Below the fan-wheel in the casing E is a spring-case G. The spring $g$ is secured at one end to the case G and at the other end to the shaft $e'$, and it exerts its force against the air-blast to return the shaft $e'$ to a position in which the pointer is above the zero-mark on the dial. On the edge of the spring-case G is a worm-wheel $g^2$, with which a worm $k$ on the shaft K engages. The shaft K is mounted in bearings in the brackets $k'$ $k'$, which are secured to the casing E, and it extends out from the casing and is provided with a small operating-wheel $k^2$. This worm-shaft K holds the spring-case in fixed position, and it also affords means for turning said case to regulate the tension of the spring.

When the described parts are assembled in the described relation with each other, the revolution of the vehicle-wheel causes the fan-wheel D to revolve at speeds proportionate to the speed of said vehicle-wheel. This forces an air-blast through the tube H into the casing E against the wheel e. This causes the said wheel e to be turned, which results in a like movement to the pointer. The force of the blast is proportionate to the speed of the fan-wheel D, and consequently the amount of deflection of the pointer is proportionate to the speed of the vehicle-wheel. The dial may be graduated so as to indicate miles per hour or to indicate the speed of the vehicle in any desired terms.

Having described my invention, I claim—

1. In a pneumatic speedometer, the combination of a casing A, a hollow shaft entering the same, a friction-wheel secured to the outer end of said shaft, a flanged ring secured to the vehicle-wheel, and a fan-wheel secured to the shaft within the casing, with a casing E, a shaft journaled therein, a fan-wheel secured to said shaft, a tube connecting said casings, and terminating in a jet-nozzle in the casing E, an adjustable spring acting on said shaft against the air-blast, a pointer secured to said shaft, and a dial, substantially as and for the purpose specified.

2. In a pneumatic speedometer, the combination of a cylindrical casing A adapted to be secured to a vehicle, and having an air-inlet, a shaft entering said casing, a fan-wheel secured to the shaft within the casing, a driving-wheel secured to the shaft outside the casing, and a flanged ring secured to the vehicle-wheel, with a casing E a shaft journaled therein, a fan-wheel secured to said shaft, a tube connecting said casings and terminating in a jet-nozzle in casing E, a pointer secured to said shaft, a graduated dial, and an adjustable spring acting against the air-blast, substantially as and for the purpose specified.

In testimony whereof I affix my signature in presence of two witnesses.

HARRY H. KELLEY.

Witnesses:
LEWIS FARWER,
E. C. MANTER.